Jan. 30, 1934.  F. E. BEACH ET AL  1,945,017
TEMPERATURE INDICATION AND CONTROL
Filed Sept. 2, 1930
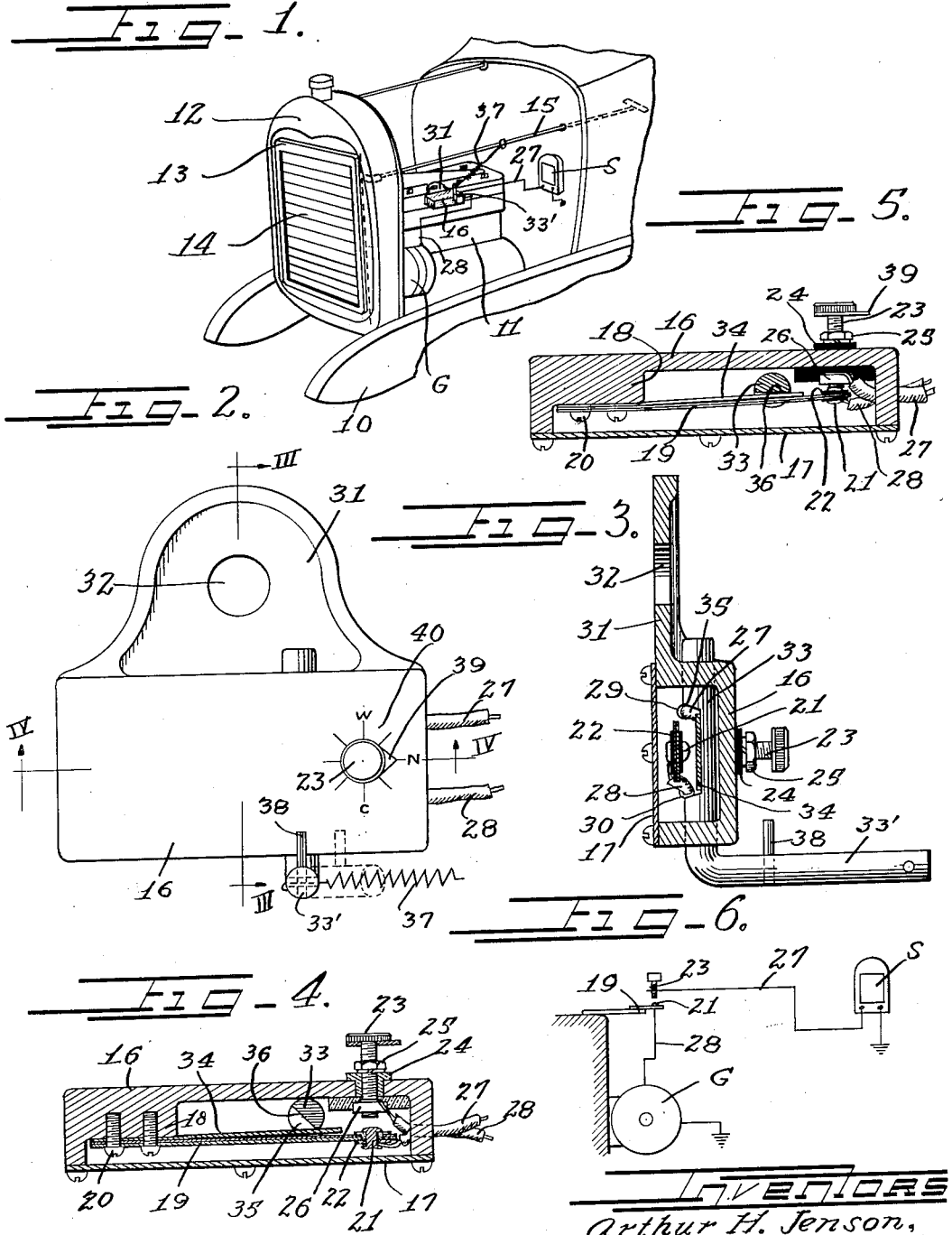
Inventors
Arthur H. Jenson,
Frederick E. Beach.
by
Attys.

Patented Jan. 30, 1934

1,945,017

UNITED STATES PATENT OFFICE 1,945,017

TEMPERATURE INDICATION AND CONTROL

Frederick E. Beach and Arthur H. Jenson, Chicago, Ill.

Application September 2, 1930. Serial No. 479,330

3 Claims. (Cl. 177—311)

Our invention relates to an improved temperature indicating and controlling arrangement which is particularly adaptable for association with the engines of automotive vehicles and the shutters or dampers on the radiators for the engine cooling systems.

An important object of the invention is to provide a thermostatic switch controlled by the temperature of the engine to close a circuit through a signal device when the temperature has reached or is beyond a certain point.

A further object is to provide a shutter or damper in association with the radiator of the engine water cooling system which damper may be manually adjusted by the driver from the driver's seat to be opened and to expose the radiator to the flow of cooling air when the audible signal has given warning that the engine temperature has reached or passed a high point.

Another object is to provide a connection between the manually operated shutter control and the thermostat whereby, when the shutter is opened, the thermostat contacts will be separated and the signal circuit will be opened.

A still further object of the invention is to utilize for the signal circuit the current from the electrical generator, which is idle when the engine is not running, so that the signal will be silent when the engine is not running, even though the thermostat is in position to close the circuit.

A further object is to provide simple means for adjusting the thermostat to close the circuit when any desired temperature is reached.

Still another object is to provide a simple thermostat structure which can be readily secured to the engine by one of the cylinder cap bolts.

The above features referred to and other features of the invention are incorporated in the structure disclosed on the drawing, in which Figure 1 is a perspective view of the front end of an automobile showing the thermostat mechanism mounted on the engine and showing also the audible signal and the manual control for the radiator shutter;

Figure 2 is a plan view of the thermostat structure;

Figure 3 is a section on plane III—III of Figure 2;

Figure 4 is a section on plane IV—IV of Figure 2, showing the thermostat contacts held apart;

Figure 5 is a similar section showing the thermostat contacts released and in electrical engagement to close the signal circuit;

Figure 6 is a diagrammatic view showing the circuit connection.

Referring to Figure 1, we show the front end of the chassis 10 of an automobile which supports the engine 11 and the radiator 12 for the liquid cooling system. A shutter frame 13 is applied to the front of the radiator and has the shutters or vanes 14 for controlling the flow of air through the radiator. In accordance with our invention, the shutters are adjustable manually from the driver's seat by means of a rod 15 extending into the vehicle body within reach of the driver.

Referring to Figures 2 to 5, the thermostat switch mechanism comprises a rectangular housing or container 16, preferably of good temperature conductive metal, having the removable closure or back plate 17. At one end the container has the lug or platform 18 to which the thermostat or bimetal element or switch blade 19 is secured at one end, as by means of screws 20. This element carries at its free end a contact 21 insulated from the element by insulation 22. In registration with this contact a contact screw 23 extends through the container wall and is insulated therefrom by insulating material 24, this screw being adjustable and being locked in adjusted position by a nut 25. At its inner end the screw carries a nut 26 by means of which the circuit conductor 27 is electrically connected with the screw and the circuit conductor 28 is secured to the contact 21 on the thermostat element, the conductors entering the housing through openings 29 and 30 in the adjacent end wall thereof. The thermostat element is applied so that, when it is heated sufficiently, it will deflect to bring its contact 22 into engagement with the contact screw 23, as shown in Figure 5. By means of a bracket 31 extending from the housing 16 and provided with a bolt hole 32, the housing may be readily supported by one of the cylinder cap screws of the engine to be in proximity to the engine in order that the thermostat element may respond to the temperature of the engine, as illustrated in Figure 1.

Referring to Figure 6, the thermostat element contact 21 is connected by the conductor 28 with a terminal of the generator G which supplies the electrical current for the engine electrical system and whose other terminal is connected or grounded to the engine frame or chassis. The conductor 27 connects the contact screw 23 with one terminal of a signal S, which may be an audible signal such as a buzzer, whose other terminal is grounded to the engine frame or chassis. This signal may be secured against the front of the dash board within the engine compartment, as shown in Figure 1, and while the engine, and consequently the generator G, is running, and the heat of the engine is sufficient to cause closure of the circuit by the thermostat, the signal will sound and warn the driver. Normally, of course, the shutters 14 are in closed position in order that the engine may be more rapidly started, and, as soon as the driver receives the warning signal, he knows that the engine has reached the proper temperature and he then pulls the rod 15 to open the shutters for the flow of cooling air through the radiator.

We preferably provide means for automatically opening the signal circuit when the driver opens the shutter in order to silence the signal while the engine is running after having been warmed up. We preferably accomplish this by means which, when the rod 15 is pulled to open the shutters 14, will act to separate the thermostat element contact from the contact screw 23 to open the signal circuit, or which, when the thermostat is in open position, will block the movement of the thermostat element to circuit closing position. This means may be in the form of a cam member 33, which may cooperate directly with the thermostat element 19 or, as shown, through a spring 34.

As shown, the cam member is a cylindrical rod having a cross groove 35 forming the flat cam face 36. The spring 35 is a flat spring which extends parallel with the thermostat element and which may be secured at one end to the lug 18 by the screws 20 which also secure the thermostat element, the spring being then between the element and the cam member 33. The cam member 33 is journalled in the upper and lower sides of the housing 16 between the spring and the housing back wall and with its groove 35 in alignment with the free end of the spring as clearly shown in Figure 3. The outer end 33' of the cam rod 33 is deflected to form a crank lever which is connected with the shutter controlling rod 15 by a connection which preferably includes a helical spring 37. An abutment pin 38 extending from the cam member end 33' limits the rotational movement of the cam member by abutting against the container or housing 16 as shown by dotted lines in Figure 2.

The spring 34 is tensed to at all times bear against the cam member 33 and, normally, that is when the shutters are closed, the cam member is in position with its cam face parallel with and engaged by the spring to be yieldingly held in this position by the spring pressure. The spring 37 is stronger than the spring 34 so that, when the rod 15 is pulled to open the shutters 14, the cam member 33 will be rotated against the pressure of the spring 34 to bring the corner or edge of the cam face against the spring 34 to thereby swing the spring toward the thermostat element. If the thermostat is closed, as shown in Figure 5, then, when the shutters are opened, the rotation of the cam member will force the spring 34 against the thermostat element and will swing it to separate its contact 21 from the contact screw 23, and the signal circuit will be opened. If the thermostat is open when the cam member is turned, as shown in Figure 4, then the spring 34 will be shifted into position to prevent circuit closure movement of the thermostat element. When the rod 15 is pushed forwardly to reclose the shutters, the tension of the spring 37 will be withdrawn from the cam member and the spring 34 will rotate the cam member back to normal position with its cam face parallel with and engaged by the spring.

Giving a brief résumé of the operation, when the engine is cold and is about to be started, the shutters 14 will be closed to prevent circulation of air through the radiator. In this position of the radiator, the cam member is in the position shown in Figure 5, with its cam face engaged by the spring 34, so that the thermostat element 19, which is then in open position, will be free to function. The engine is now started in the usual way and, as soon as it is properly heated up, the thermostat element will respond to the heat and will flex to bring its contact 21 into engagement with the contact screw 23 to close the circuit supplied by the generator G so that the signal S will become effective to notify the driver of the temperature condition. The driver then pulls the rod 15 to open the shutters 14 for the circulation of cooling air and for the normal running operation of the engine, and, in so doing, he actuates, through the spring 37, the cam member to cam the spring 34 against the thermostat element to separate the thermostat contacts and to open the signal circuit. In cold weather the driver may from time to time close the shutters and at the same time release the cam from the spring 34 and the thermostat element, and, if the engine temperature is normal, the thermostat element will immediately close the circuit and sound the signal. If the engine has become too cold, the signal will not sound, and then the driver can keep the shutters closed until the temperature has been restored to normal and the indicator is operated.

When the car is parked in cold weather, the driver usually shuts off the engine and then closes the shutters to retain the heat as long as possible in the water circulatory system. Of course, when the shutters are closed, the cam is actuated to release the thermostat element for movement to closure position, but, when the engine is shut off, the generator stops operating and there will be no current supply for the signaling circuit and the signal will remain inert. When the engine is restarted and the generator is driven, and the engine is still hot enough, the circuit will be closed by the thermostat and the signal will function and then the driver will open the shutters.

By releasing the set nut 25, the contact screw 23 may be adjusted so that setting can be readily made for closure of the circuit by the thermostat when the engine reaches a predetermined temperature. The screw may be provided with a pointer 39 cooperating with dial indications 40 so that accurate adjustment may be made.

By referring to Figures 3, it will be noted that the spring 34, besides functioning to lock the cam member 33 in normal position against rotation, serves also, by its engagement in the slot or groove 35, to lock the cam member against longitudinal displacement in the housing 16.

It is evident that, instead of using an audible signal, a visible signal such as a lamp could be provided and located within the range of vision of the driver. It is also evident that the thermostat mechanism, instead of being adapted to cause closure of the signaling circuit when a certain high temperature is reached, could be adapted to function to close the signal circuit when a certain low temperature is reached in order to give warning to the driver so that freezing of the cooling water in the engine could be prevented.

Other changes in construction, arrangement and operation could be made without departing from the scope and principles of the invention, and we, therefore, do not desire to be limited to the precise structure, arrangement and operation shown and described.

We claim as follows:

1. The combination with the engine of an automotive vehicle, the engine cooling system, and shutters for controlling the air flow for the cooling system, of means for manually setting the shutters, a signal circuit, a current generator driven by the engine for supplying said circuit, a thermostatic switch responsive to a predetermined high temperature adjacent to the engine for controlling said circuit, and means determined by the opening of said shutters to render said switch inoperative to close said circuit.

2. The combination with an internal combustion engine, the cooling circulatory system, and shutters for controlling the air flow for the system, of means for opening and closing said shutters, a signal circuit, a thermostat switch responsive to the temperature of the engine and tending to close said circuit when a predetermined high temperature is reached, and means connected with said shutter opening means operative upon the opening of said shutters to prevent said switch from closing said circuit.

3. In combination, an internal combustion engine, the cooling circulatory system therefor including a radiator, shutter mechanism for opening and closing the passage of air through said radiator, a thermally responsive switch, a signal circuit controlled by said switch, said switch being free to respond to a predetermined high temperature to close said circuit when said shutter mechanism is closed, and means controllable from the driver's seat for simultaneously opening said shutter mechanism and conditioning said switch to interrupt said circuit independently of thermal conditions.

FREDERICK E. BEACH.
ARTHUR H. JENSON.